United States Patent
Eriksson et al.

(10) Patent No.: US 8,948,082 B2
(45) Date of Patent: Feb. 3, 2015

(54) METHOD AND APPARATUS OR ALLOCATING RESOURCES TO USER EQUIPMENTS IN A TELECOMMUNICATIONS SYSTEM

(75) Inventors: Erik Eriksson, Linkoping (SE); Eva Englund, Linkoping (SE); Kristina Jersenius, Linkoping (SE)

(73) Assignee: Optis Cellular Technology, LLC, Plano, TX (US)

( * ) Notice: Subject to any disclaimer, the term of this patent is extended or adjusted under 35 U.S.C. 154(b) by 479 days.

(21) Appl. No.: 13/263,255

(22) PCT Filed: Apr. 7, 2009

(86) PCT No.: PCT/SE2009/050363
§ 371 (c)(1),
(2), (4) Date: Oct. 6, 2011

(87) PCT Pub. No.: WO2010/117311
PCT Pub. Date: Oct. 14, 2010

(65) Prior Publication Data
US 2012/0033628 A1    Feb. 9, 2012

(51) Int. Cl.
*H04B 7/212* (2006.01)
*H04W 72/12* (2009.01)
*H04W 8/24* (2009.01)

(52) U.S. Cl.
CPC .......... *H04W 72/1284* (2013.01); *H04W 8/24* (2013.01); *H04W 72/1231* (2013.01)
USPC ........... 370/322; 370/326; 370/337; 370/348; 370/395.4; 370/438; 370/443

(58) Field of Classification Search
USPC .............. 370/322, 326, 329, 337, 348, 395.4, 370/395.42, 395.43, 438, 443, 444
See application file for complete search history.

(56) References Cited

U.S. PATENT DOCUMENTS

| 2010/0091727 | A1* | 4/2010 | Ishii | 370/329 |
| 2010/0120397 | A1* | 5/2010 | Kazmi et al. | 455/410 |
| 2011/0182224 | A1* | 7/2011 | Ishii | 370/311 |

FOREIGN PATENT DOCUMENTS

WO    WO 2009/038381 A2    3/2009

OTHER PUBLICATIONS

Interdigital Communications et al, Procedures for Resolving Collisions Between SR and Periodic CQI Reports and Draft CRs to 36.213, 36.212 and 36.211. 3GPP Draft; R1-083514 3$^{rd}$ Generation Partnership Project; Mobile Competence Centre; Sophia-Antipolis, France. Sep. 24, 2008.

* cited by examiner

*Primary Examiner* — Alvin Zhu
(74) *Attorney, Agent, or Firm* — Vincent J. Allen; James H. Ortega; Carstens & Cahoon, LLP

(57) ABSTRACT

The present invention relates to a method and a radio base station (700) for allocating resources to a UE such that the UE can transmit at least channel feedback information to the radio base station (700). According to exemplary embodiments of the present invention, the radio base station (700) is configured to take the possibility of a scheduling request transmission from the UE into account when allocating the channel feedback information resources in order to avoid wasting of uplink resources.

17 Claims, 7 Drawing Sheets

SHORT FORMAT BSR

| RBG ID 2 BITS | BUFFER SIZE 6 BITS | OCTET 1 |

FIGURE 3A

LONG FORMAT BSR

| BUFFER SIZE #1 | BUFFER SIZE #2 | OCTET 1 |
| BUFFER SIZE #2 | BUFFER SIZE #3 | OCTET 2 |
| BUFFER SIZE #3 | BUFFER SIZE #4 | OCTET 3 |

FIGURE 3B

METHOD AND APPARATUS OR ALLOCATING RESOURCES TO USER EQUIPMENTS IN A TELECOMMUNICATIONS SYSTEM

TECHNICAL FIELD

The present invention relates generally to the field of wireless telecommunications, and, more particularly, to methods and apparatuses for allocation of resources to one or several user equipments in a telecommunications system.

BACKGROUND

The 3rd Generation Partnership Project (3GPP) is responsible for the standardization of the UMTS (Universal Mobile Telecommunication Service) system, and LTE (Long term Evolution) is now under discussion as a next generation mobile communication system of the UMTS system. LTE is a technology for realizing high-speed packet-based communication that can reach data rates of more than 100 Mbps on the downlink and of more than 50 Mbps on the uplink. The 3GPP work on LTE is also referred to as Evolved Universal Terrestrial Access Network (E-UTRAN).

Generally, one or more cells are allocated to a radio base station, known in the 3GPP LTE system as eNB (enhanced/evolved NodeB) or eNodeB. In addition, eNodeBs in LTE will interact directly with the core network and with other eNodeBs. A plurality of user equipments can be placed in a cell served by an eNB. A user equipment (UE) can be represented by a mobile phone, a wireless terminal, a laptop, a personal computer, a personal digital assistant, a voice over internet protocol (VoIP) capable phone or any other 3GPP LTE capable UE. A wireless transmission from a UE to a eNodeB is known as a uplink transmission whereas a wireless transmission from the eNodeB to the UE is known as a downlink transmission.

In LTE, the downlink supports channel dependent scheduling in both the time and the frequency domains. For this purpose, the eNodeB is configured to transmit reference signals to a UE. The UE uses the reference signals to determine/estimate the quality of the downlink channel and reports, over the uplink, a channel feedback information report back to the eNodeB. A CSI (channel status information) or a CQI (channel quality indication) are examples of the channel feedback information. Based on the reported information, the eNodeB can schedule resources for the UE and/or adapt the link quality by e.g. changing the modulation scheme or the coding scheme or the transmit power etc.

In 3GPP it has been agreed that, for LTE, the transmission of the channel feedback information can be performed periodically on a so called physical uplink control channel (PUCCH) or a-periodically on a so-called physical uplink shared channel (PUSCH) used for transmitting data.

Thus as described above, in LTE, channel feedback information is transmitted by the UE over the uplink at periodic interval or a-periodic intervals. The UE may also transmit scheduling requests over the uplink in order to request resources. It should be noted that in LTE, the uplink access is controlled by the eNodeB through uplink grants transmitted in the downlink. The UE may inform the eNodeB that data is pending for transmission to the eNodeB.

In the 3GPP technical specifications 3GPP TS 36.321, entitled "*Evolved Universal Terrestrial Radio Access (E-UTRA); Medium Access Control (MAC) protocol specification*" Two functions are currently standardized buffer status reports and scheduling requests. The buffer status report is used by the UE to indicate to the eNodeB about an amount of data available in a buffer of a UE that is ready for transmission to the eNodeB. A scheduling request message can be expressed with a single bit (one bit) of information, and the UE requests transmission resource allocation for buffer status report using the on-bit information.

When e.g. new data arrives in the UE buffer, a buffer status report is triggered and if the UE does not have an uplink grant allocated for transmitting data, the UE sends a scheduling request message at the next SR opportunity. The eNodeB can assign a UE dedicated periodic SR resources on the PUCCH for sending a scheduling request message. If the UE has been assigned Dedicated SR (D-SR) resources the UE will wait for the next D-SR resource for sending the scheduling request. If the UE does not have D-SR resources allocated on PUCCH the UE performs a Random access SR (R-SR) on the Random Access Channel (RACH) opportunity. If this UE in the time interval for scheduling request also is scheduled an allocation for a channel feedback information report, a collision may occur between the channel feedback information report and the scheduling request message.

A known solution to the collision problem is described in the 3GPP technical specifications 3GPP TS 36.213, entitled "*Evolved Universal Terrestrial Radio Access (E-UTRA) Physical layer procedures (Release 8)*". According to this prior art, in case of a collision between the channel feedback information and the scheduling request, the channel feedback information is dropped. This is illustrated in FIG. 1. As shown, a scheduled channel feedback information, here denoted CSI, is dropped due to that it coincides with a resource for a scheduling request, denoted SR. In this exemplary scenario, the SR is assumed transmitted periodically on the PUCCH whereas the scheduled CSI is assumed transmitted a-periodically on the PUSCH. The dashed line illustrates that data arrives in the buffer of the UE.

A drawback with the solution of this prior art is that it leads to a waste of uplink radio resources since the scheduled CSI resource from the UE is dropped. Furthermore, dropping the channel feedback information leads to a waste of uplink grants when a transmission of a channel feedback information is scheduled on the PUSCH. If on the other hand the scheduling request is dropped instead of the channel feedback information, an increased uplink data transmission delay is introduced since the UE has to wait a longer time before being able to send data in its buffer.

SUMMARY

It is therefore an object of the exemplary embodiments of the present invention to address the above mentioned problems and to provide a method and an apparatus that resolves the collision problem(s) described above by down-prioritizing the allocation of a resource for the channel feedback information or by requesting a channel feedback information and a buffer status report thereby avoiding wasting uplink resources and further avoiding the introduction of unnecessary uplink data transmission delays.

According to a first aspect of embodiments of the present invention, the above stated problem is solved by means of a method in a radio base station for allocating radio resources to a user equipment. The UE comprises one or several buffers for buffering data to be sent over the uplink to the radio base station. The UE is further configured to receive signals from the radio base station for enabling the UE to transmit channel feedback information to the radio base station. According to embodiments of the present invention, the method comprises: predicting when the UE is scheduled to transmit a scheduling request for one or several resources; determining whether an allocation of a resource for the channel feedback information coincides with a resource for the scheduling request, and if the allocation of a resource for the channel feedback information coincides with a resource for the scheduling request; down-prioritizing the allocation of the resource for the channel feedback information or requesting in a message to the UE, the channel feedback information and a buffer status report about an amount of data available for transmission from the UE.

According to a second aspect of embodiments of the present invention, the above stated problem is solved by means of a radio base station capable in allocating radio resources to a user equipment. The UE comprises one or several buffers for buffering data to be sent over the uplink to the radio base station. The UE is further configured to receive signals from the radio base station for enabling the UE to transmit channel feedback information to the radio base station. According to embodiments of the present invention, the radio base station is configured to predict, by means of a predicting means, when the UE is scheduled to transmit a scheduling request for one or several resources; the radio base station is further configured to determine, by means of a allocating means, whether an allocation of a resource for the channel feedback information coincides with a resource for the scheduling request, and if the allocation of a resource for the channel feedback information coincides with a resource for the scheduling request, the radio base station is configured to down-prioritize the allocation of the resource for the channel feedback information or to request in a message to the UE, the channel feedback information and a buffer status report about an amount of data available for transmission from the UE.

Thus, the radio base station takes the possibility of a scheduling request transmission into account when allocating channel feedback information resources thereby avoiding wasting uplink resources since the channel feedback information is not dropped. Furthermore, unnecessary introduction of uplink data transmission delays is also avoided since the radio base station is configured to request, in a message to the UE, the channel feedback information and a buffer status report in case the allocation of channel feedback information resource occurs concurrently with a resource for the scheduling request. An advantage with the present invention is therefore to avoid wasting of resources.

Another advantage with the present invention is to avoid unnecessary uplink data transmission delays.

Still other objects and features of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3A is a diagram illustrating a short format for a buffer status report.

FIG. 3B is a diagram illustrating a long format for a buffer status report.

DETAILED DESCRIPTION

In the following description, for purposes of explanation and not limitation, specific details are set forth such as particular architectures, scenarios, techniques, etc. in order to provide thorough understanding of the present invention. However, it will be apparent to the person skilled in the art that the present invention and its embodiments may be practiced in other embodiments that depart from these specific details.

The different embodiments of the present invention are described herein by way of reference to particular example scenarios. In particular, the invention is described in a non-limiting general context in relation to resource allocation in a telecommunications network system that is based on the third generation (3G) long term evolution (LTE) concept. It should be noted that the present invention is not restricted to 3G LTE but can be applicable in other wireless systems such as WiMAX (worldwide interoperability for microwave access), or HSPA (high speed packet access) or HSUPA (high speed uplink packet access) or HSDPA (high speed downlink packet access) or WCDMA (wideband code division multiple access) etc.

Figure 1:
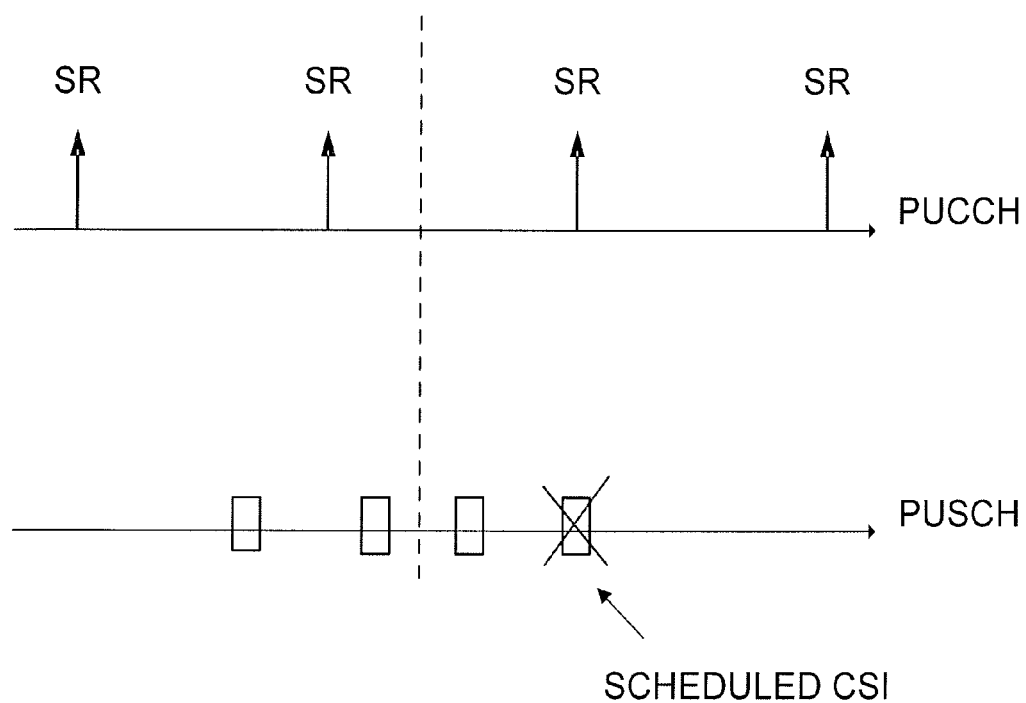
FIG. 1 is a diagram illustrating an exemplary scenario where, in accordance with a prior art solution, a channel feedback information resource is dropped if it coincides with a resource for a scheduling request
Figure 2:
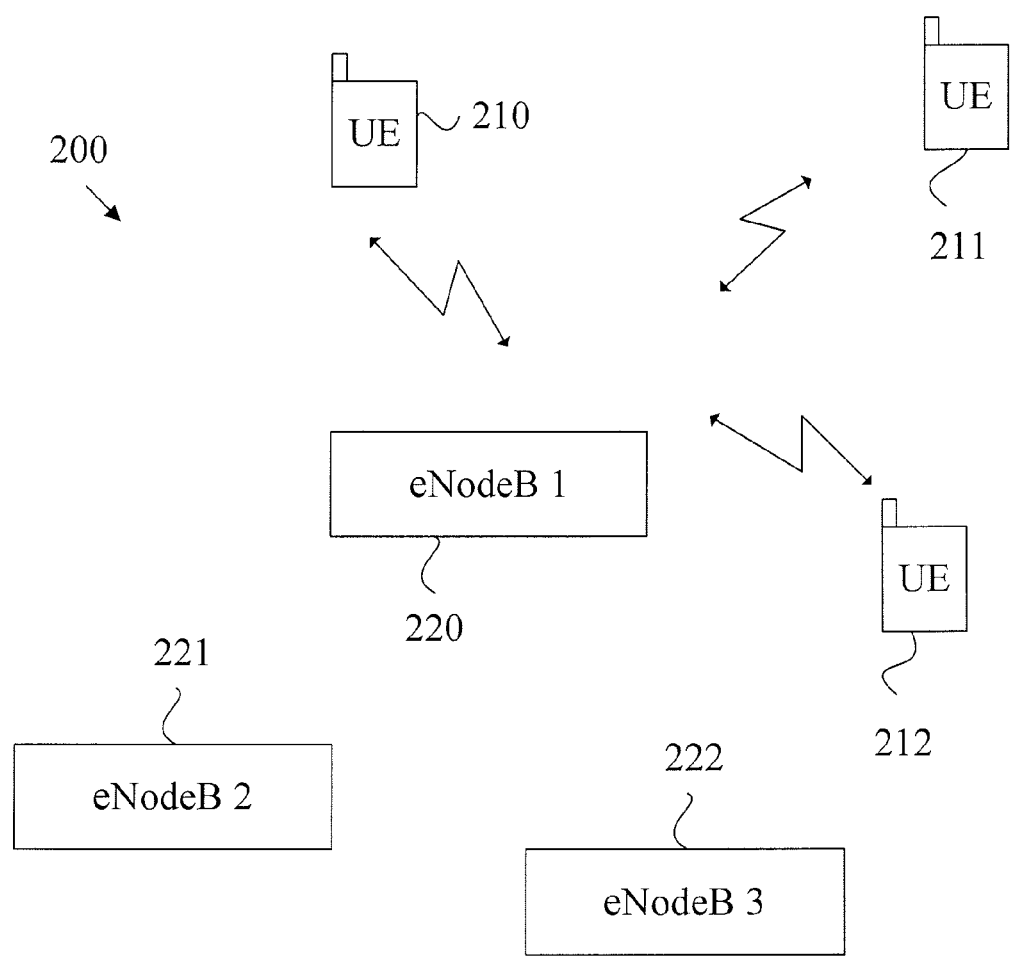
FIG. 2 is a diagram illustrating an example of a wireless network telecommunications system wherein exemplary embodiments of the present invention can be applied.

Referring to FIG. 2 there is illustrated a block diagram of an exemplary wireless telecommunications network system 200 in which the different exemplary embodiment of the present invention may be applied. Note that the system 200 depicted in FIG. 2 only shows transceivers or nodes that are necessary for understanding the different exemplary embodiments of the present invention. As shown, the system 200 which is here considered to represent a simplified 3GPP LTE system, comprises a number of user equipments UE 210, UE 211, UE 212, and apparatuses acting as radio base stations and denoted eNodeB 1 220, eNodeB 2 221 and eNodeB 3 222. One of the functions of the eNodeBs is to control traffic to and from UEs in a cell. A UE is suitable to be used as a mobile phone, a wireless terminal, a laptop, a personal computer, a personal digital assistant, a voice over internet protocol (VoIP) capable phone or any other 3GPP LTE capable equipment. Note that in FIG. 2, the number of UEs and eNodeBs is only illustrative and the embodiments of the present invention are not restricted to any particular number of UEs and/or number of eNodeBs.

As mentioned earlier, in the 3GPP LTE system, it is the eNodeB that takes charge of the scheduling of resources both in the downlink and in the uplink. Furthermore, in LTE the downlink supports channel dependent scheduling which means that the eNodeB transmits reference signals and the UEs use said signals to estimate or determine the quality of the downlink channel. Based on that the UEs send channel quality information reports to the eNodeB. A scheduler and a link adapter located in the eNodeB uses said reports to schedule resources respectively adapt the link quality.

In the following and for easily understanding the different exemplary embodiments of the present invention, the channel feedback information is referred to as CSI (Channel State information). The CSI may consist of a Channel Quality Indicator (CQI), Rank Indicator (RI), Pre-coding Matrix Indicator (PMI) or combinations of them, It should however be noted that these are only examples of a channel feedback information. Therefore, the exemplary embodiments of the present invention are not restricted to CSI, RI, PMI or CQI.

A CSI report can be send from a UE to a eNodeB periodically on the PUCCH or a-periodically on the PUSCH used for data. The a-periodic CSI report is requested in a uplink grant and can be transmitted both with or without uplink data. A CSI report on PUSCH without payload data is referred to as CSI-only and can be triggered by a defined format in the uplink format. When a UE has pending data to transmit it can transmit a buffer status report (BSR) and a scheduling request (SR).

It should be noted that a BSR is a medium access control element which is transmitted by the UE, over the uplink, together with other payload data information informing the eNodeB of the current status of one or multiple queues. According to 3GPP TS 36.321, entitled "*Evolved Universal Terrestrial Radio Access (E-UTRA); Medium Access Control (MAC) protocol specification*", the BSR is triggered when at least one of the following criterions is fulfilled:
- when uplink (UL) data arrives in the UE transmission buffer and the data belongs a radio bearer group (RBG) also known as a logical channel group (LCG), with higher priority than the priorities of those for which data is already available in the UE for transmission, in which case the BSR is referred to as "Regular BSR";
- when UL shared channel resources (UL-SCH resources) are allocated and a number of so called padding bits is larger than the BSR size, in which case the BSR is referred to as "Padding BSR".
- when the UE arrives to a new cell, in which case the BSR is also referred to here as "Regular BSR";
- when a periodic BSR timer expires, in which case the BSR is referred to as "Periodic BSR".

Referring to FIG. 3A and FIG. 3B there are illustrated two different formats of a BSR. FIG. 3A shows a short format BSR whereas FIG. 3B shows a long format BSR.

As shown in FIG. 3A, the short format BSR is one octet (i.e. 1 byte) long and is used by the UE to report data available for transmission in a single RBG. As shown, 2 bits are used for indicating the identity of the RBG (RBG ID) and 6 bits can be used to report the size of the buffer. If more than one RBG has data available for transmission, the UE reports the long format BSR. The long format BSR as illustrated in FIG. 3B comprises 3 octets and each octet can be used to report a buffer size. It should be noted that in order to limit the size of the BSR, it has been decided in 3GPP to group radio bearers into four RBGs.

For the padding BSR trigger, a transmission of short or long format BSR depends on the number of padding bits. For the rest of the triggers among which some of them have been described above, the transmission of short or long format BSR depends on if one or more than one of the RBGs contain buffered data.

A scheduling request (SR), which as mentioned before, is a one bit type of information, is used by the UE to indicate to the eNodeB that a BSR (e.g. a Regular BSR) has been triggered. The SRs are transmitted in pre-configured resources that are known to the eNodeB and the UE, but they are only transmitted when the UE actually has some data to be transmitted over the uplink channel. In other words, the eNodeB predicts/knows when the UE is scheduled to transmit a SR for a resource but the eNodeB does not know when the UE will actually transmit a SR. A SR can be transmitted on a dedicated resource assigned by the eNodeB on the PUCCH, or if such resource is not allocated on the random access channel (RACH). If for example, a SR coincides with an uplink data transmission the SR is canceled and a BSR is sent instead.

When new data arrives in the buffer of the UE a BSR is triggered, as described above. If this UE does not have an uplink grant for an uplink data transmission, the UE transmits a SR message at the next opportunity. If this UE in the time interval for SR also is scheduled an allocation for a CSI report, a collision may occur between the CSI report and the SR message.

According to an exemplary embodiment of the present invention, the eNodeB is configured to take the possibility of a SR transmission from the UE into account when allocating one or several CSI resources since the eNodeB predicts/knows when the UE is scheduled to transmit the SR for a resource. If the eNodeB determines that an allocation of one or several resources coincide(s) with a resource for the SR, the eNodeB, in accordance with an exemplary embodiment of the present invention, is configured to down-prioritize the allocation of the CSI resource(s) by e.g. distributing CSI resources in order to minimize a collision between the SR and the CSI resources, thereby avoiding the dropping of the CSI resource(s).

Figure 4:
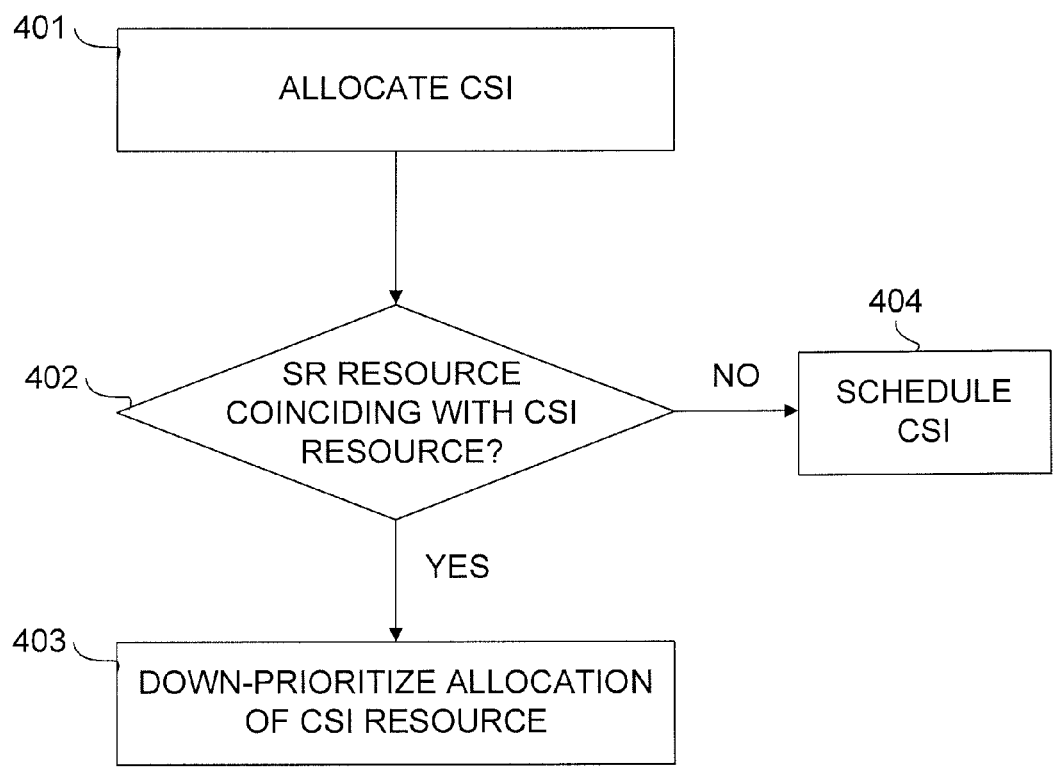
FIG. 4 is a diagram illustrating a flowchart of a method performed, in a radio base station, according to an exemplary embodiment of the present invention.

Referring to FIG. 4 there is illustrated a flowchart of a method in according to the above exemplary embodiment of the present invention. It is here considered the case where the eNodeB allocates a CSI resource for the UE. This is indicated in step 401 in FIG. 3. This CSI resource may be periodic on PUCCH, or a-periodic on PUSCH. As mentioned earlier, the eNodeB is able to predict when the UE is scheduled to transmit a SR for one or several resources. However, the eNodeB cannot predict when the UE will actually transmit a SR for a resource. As shown in FIG. 4, in step 402, the eNodeB is configured to determine if the UE has a SR resource, on e.g. PUCCH or RACH, which coincides with the potential CSI resource. If the SR resource does not coincide with the CSI resource, the eNodeB schedules the CSI resource. This is indicated in step 404. However if the SR resource coincides (step 403) with the CSI resource in e.g. the same time-frame, the eNodeB is configured to down-prioritize the allocation of the CSI resource by distributing CSI resource(s) to reduce the risk of collision between the SR resource and the CSI resource.

Figure 5:
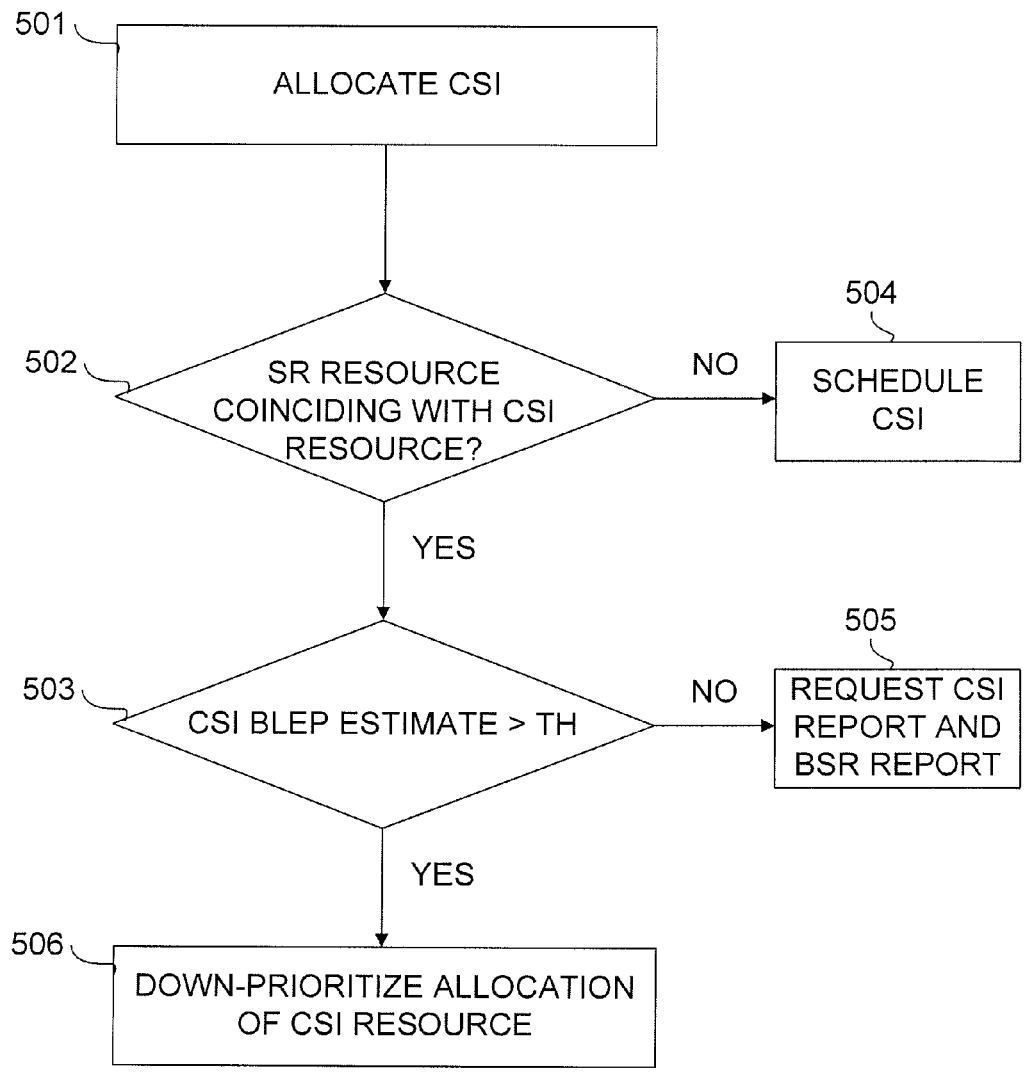
FIG. 5 is a diagram illustrating a flowchart of a method performed, in a radio base station, according to another exemplary embodiment of the present invention.

Referring to FIG. 5 there is illustrated a flowchart of a method in accordance with another exemplary embodiment of the present invention. It is also here considered the case where the eNodeB allocates a CSI resource for the UE (step 501) and that the eNodeB predicts when the UE is scheduled to transmit a SR for one or several resources. In this exemplary embodiment it is also assumed the case of dynamically scheduled resources on e.g. PUSCH. This enables the eNodeB to assign resources in a controlled manner.

According to this exemplary embodiment of the present invention and similarly to the previously described exemplary embodiment, the eNodeB is configured to determine if the UE has a SR resource which coincides with the allocated CSI resource (step 502). If the SR resource does not coincide with the CSI resource, the eNodeB schedules the CSI resource.

This is indicated in step 504. If on the other hand, the SR resource coincides with the CSI resource, the eNodeB is configured to request (step 505), in a message to the UE, the CSI report and a BSR report about an amount of data available for transmission from the UE to the eNodeB. In this exemplary embodiment of the present invention, the eNodeB allocates or includes an additional data grant in the request in order for the UE to indicate the BSR when such BSR is triggered thereby disabling the SR. Thus, in case of coinciding SR and CSI resources, the eNodeB not only requests the CSI report but also leaves room for a BSR by adding the additional data grant.

As shown in FIG. 5, the eNodeB is configured to request the CSI report and to leave room for the BSR based on whether an estimated block error probability (BLEP) of a CSI transmission including a data grant for a BSR (or a data grant large enough to convey a BSR), is above a predefined threshold value or not. If it is determined (step 503) that the estimated BLEP of the CSI transmission including a data grant, denoted CSI BLEP ESTIMATE, is less than the predefined threshold, denoted, TH, the CSI report is requested and room (or additional data grant) is left for the BSR (step 505). A suitable value of the threshold TH can be e.g. 1%. Any other suitable threshold value can also be used and therefore the exemplary embodiments of the present invention are not restricted to any particular threshold value.

According to an exemplary embodiment of the present invention, the additional data grant for the BSR comprises a number of bits required for the BSR, a small BSR or a large BSR. If, for example, a "Regular BSR" or a "Periodic BSR" is triggered, a BSR is transmitted; otherwise data or a "Padding BSR" is transmitted.

Referring back to FIG. 5, in the case the CSI BLEP ESTIMATE exceeds the threshold TH, (at 506) the eNodeB is configured to down-prioritize the CSI allocation, based on whether or not the UE has an SR resource, or the CSI is requested without data.

It should be noted that an estimation of the BLEP of the CSI transmission can be performed using e.g. information from previous transmissions on the PUSCH or can be performed using measurement on e.g. sounding reference signals received from the UE. The sounding reference signals are reference signals generally used for measurement of uplink channel quality and can thus be used for CQI and/or CSI measurements.

As mentioned earlier, in case the estimated BLEP of the CSI transmission including a data grant for a BSR is less that the predefined threshold TH, the CSI report is requested and room is left for the BSR. If the additional data grant for the BSR is left for the larger format BSR, then the CSI report is requested and room is left for a large format BSR. If this is not the case, the eNodeB is configured to determine if the CSI BLEP ESTIMATE exceeds TH for the short format BSR and if the threshold TH is not exceeded, the CSI report is requested and room is left for a short format BSR.

The above described procedure of checking if the addition of a BSR, large or small, can be included without loss of performance in not only restricted to the case of colliding SR and the CSI resources. In other words, the procedure can also be used when scheduling UEs for e.g. the CSI resource or the CSI-only resource in order to obtain more detailed UE buffer status. Furthermore, if the eNodeB is configured to allocate resources periodically for a dedicated or a specific UE, the allocation can be performed in such a way that the CSI and SR resources are allocated in separate time or separate timeframes (or subframes) on PUCCH or RACH.

As an example, can a UE be assigned SR resources on e.g. PUCCH with a periodicity of 10 ms. If said UE is active in the downlink new CSI reports may be needed at the eNodeB at approximately the same periodicity 10 ms. In this exemplary case scenario, the SR and CSI resources can coincide approximately 10% of the CSI scheduling instances. In order to avoid dropping the CSI report(s), the eNodeB can therefore down-prioritize the allocation of the resource for the CSI so that to minimize collision between SR and CSI resources or the eNodeB can request the CSI report and leave room for a BSR if such is triggered. In the latter case, the SR is instead disabled since a BSR will be reported to the eNodeB if said BSR is triggered in the UE.

Figure 6:
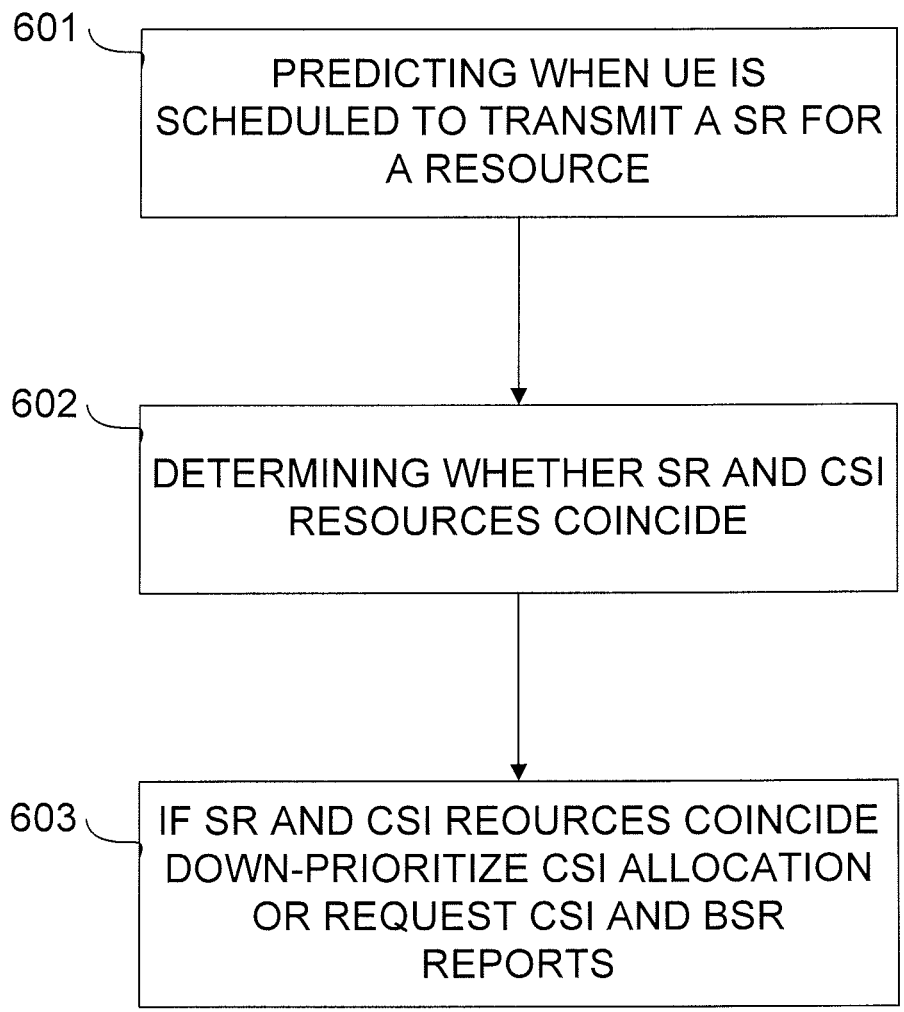
FIG. 6 is a diagram illustrating a flowchart of a method performed, in a radio base station, according to exemplary embodiments of the present invention.

Referring to FIG. 6 there is illustrated a flowchart of a method, aimed to be performed in a radio base station (i.e. eNodeB), in accordance with the previously described embodiments of the present invention. The main steps of the method comprise:

(601) predicting when a UE is scheduled to transmit a scheduling request (SR) for one or several resources;

(602) determining whether an allocation of a channel feedback information resource (e.g. CSI resource or CQI resource) coincides with the SR resource; and (603) if the SR and the CSI (or e.g. CQI) resources coincide, down-prioritizing the allocation of the CSI (or CQI) resource or request the CSI report (or CQI) and a buffer status report (BSR) about an amount of data available for transmission by the UE.

Figure 7:
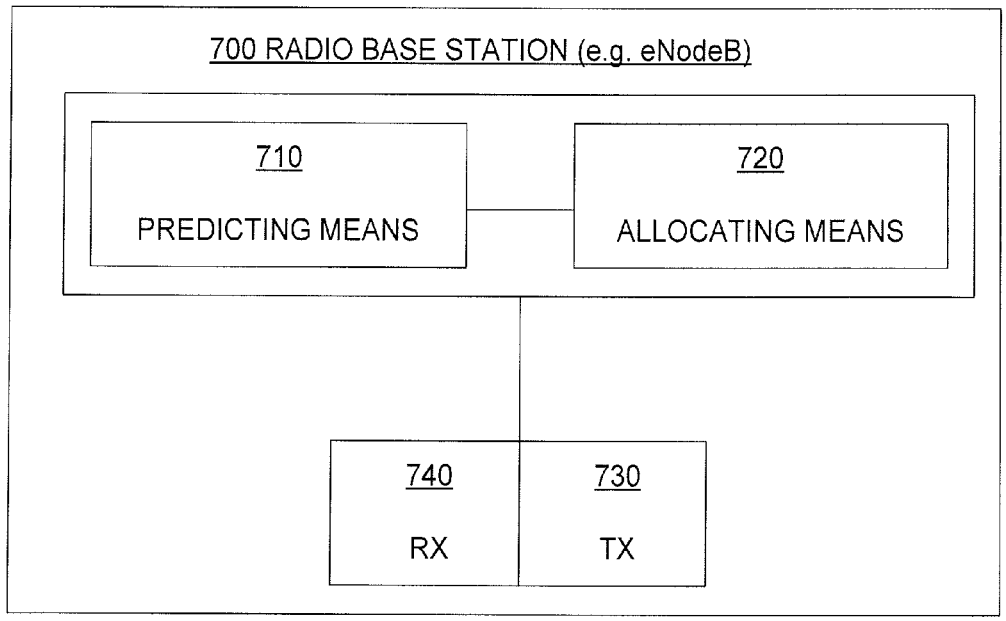
FIG. 7 illustrates a block diagram of an exemplary radio base station according to embodiments of the present invention.

Referring to FIG. 7 there is illustrated a block diagram of an exemplary radio base station 700 (e.g. eNodeB) being configured/arranged to allocate resources to a UE and further configured to send signals to the UE for enabling the UE to transmit channel feedback information (e.g. CSI or CQI) back to the eNodeB. As shown in FIG. 7, the radio base station 700 comprises predicting means 710 adapted to predict when the UE is scheduled to transmit a SR for a resource. The radio base station 600 further comprises an allocating means 720 configured to allocate a channel feedback information (e.g. CSI or CQI) resource. The allocating means may in addition act as a resource scheduler. The allocating means 720 is further configured to determine whether the allocation of the CSI (or CQI) resource coincides with the resource for the SR. If the allocating means 720 determines that the SR and CSI (or CQI) resources coincide, said allocating means 720 is configured to down-prioritize the allocation for the CSI (or CQI) or to request, in a message to the UE, the CSI (or CQI) resource and leave room for a BSR about an amount of data available for transmission from the UE. The request is send by means of a transmitting means 730, denoted TX in FIG. 7. The radio base station 700 also comprises receiving means 740, denoted RX in FIG. 7, for receiving signals from the UE. Additional actions performed by the radio base station have already been described and are therefore not repeated. It should however be mentioned that the different exemplary blocks shown in FIG. 7 are not necessarily separated. Furthermore the TX means 730 and the RX means 740 are not necessarily included in the same block i.e. they each can be represented by a single block. The radio base station 700 is therefore not restricted and is not limited to the exemplary block diagrams shown in FIG. 7. In addition, the radio base station 700 may also comprise other element and/or blocks not illustrated in FIG. 7.

As evident from the description above, several advantages are achieved by the different embodiments of the present invention. As an example, the radio base station takes the possibility of a scheduling request transmission into account when allocating channel feedback information resources thereby avoiding wasting uplink resources since the channel feedback information is not dropped if it coincides with a scheduling request. Furthermore, unnecessary introduction of uplink data transmission delays is also avoided since the radio base station is configured to request the channel feedback information and leave room for a buffer status report. In both cases more efficient control channel usage is achieved.

The present invention and its embodiments can be realized in many ways. For example, one embodiment of the present invention includes a computer-readable medium having instructions stored thereon that are executable by a radio base station (e.g. eNodeB or eNB). The instructions executable by the radio base station and stored on a computer-readable medium perform the method steps of the present invention as set forth in the claims.

The different exemplary embodiments of the present invention have being described in a non-limiting general context in relation to resource allocation in a telecommunications network system that is based on the LTE concept. It should be noted that the present invention is not restricted to LTE but can be applicable in other wireless systems such as WiMAX or HSPA HSUPA or HSDPA etc.

While the invention has been described in terms of several preferred embodiments, it is contemplated that alternatives, modifications, permutations and equivalents thereof are considered within the scope of the present invention. It is therefore intended that the following appended claims include such alternatives, modifications, permutations and equivalents as fall within the scope of the present invention.

The invention claimed is:

1. A method in a radio base station for allocating resources to a user equipment (UE), said UE having at least one buffer for buffering data to be sent to the radio base station and configured to receive signals from the radio base station for enabling the UE to transmit channel feedback information to the radio base station, said method comprising the steps of:
predicting when the UE is scheduled to transmit a scheduling request for at least one resource;
determining whether an allocation of a resource for the channel feedback information coincides with a resource for the scheduling request; and
if it is determined that said allocation of the resource for the channel feedback information coincides with the resource for the scheduling request, down-prioritizing the allocation of the resource for the channel feedback information or requesting, in a message to the UE, the channel feedback information and a buffer status report about an amount of data available for transmission from the UE to said radio base station, wherein down-prioritizing comprises down-prioritizing the allocation of the resource for the channel feedback information when an estimated block error probability of a channel feedback information transmission exceeds a predefined threshold value.

2. The method according to claim 1, wherein down-prioritizing comprises distributing said resource for the channel feedback information to minimize collision between the resource for the scheduling request and the resource for the channel feedback information.

3. The method according to claim 1, further comprising requesting said channel feedback information and said buffer status report when an estimated block error probability of a channel feedback information transmission including a data grant for a buffer status report is less than a predefined threshold value.

4. The method according to claim 1, wherein requesting said buffer status report comprises allocating a data grant in said message in order for the UE to indicate said buffer status report when the buffer status report is triggered in the UE.

5. The method according to claim 4, wherein allocating said data grant comprises indicating a number of bits required for the buffer status report.

6. The method according to claim 1, further comprising disabling the resource for the scheduling request.

7. The method according to claim 1, wherein the channel feedback information corresponds to a channel quality indicator (CQI) or a channel state information (CSI).

8. The method according to claim 1, wherein said step of determining comprises determining whether an allocation of a resource for the channel feedback information coincides with a resource for the scheduling request, wherein said allocation is periodic or a-periodic.

9. The method according to claim 8, wherein the allocation is periodic on a physical uplink control channel (PUCCH).

10. The method according to claim 8, wherein the allocation is a-periodic on a physical uplink shared channel (PUSCH).

11. A radio base station for allocating resources to a user equipment (UE), said UE having at least one buffer for buffering data to be sent to the radio base station and configured to receive signals from the radio base station for enabling the UE to transmit channel feedback information to the radio base station, the radio base station comprising:
predicting means configured to predict when the UE is scheduled to transmit a scheduling request for at least one resource; and
allocating means configured to determine whether an allocation of a resource for the channel feedback information coincides with a resource for the scheduling request;
wherein,
if said allocating means determines that said allocation of the resource for the channel feedback information coincides with the resource for the scheduling request, the allocating means is configured to down-prioritize the allocation of the resource for the channel feedback information or to request, in a message to the UE, the channel feedback information and a buffer status report about an amount of data available for transmission from the UE to said radio base station, wherein said allocation means is configured to down-prioritize the allocation of the resource for the channel feedback information when said allocating means determines that an estimated block error probability of a channel feedback information transmission including a data grant for a buffer status report exceeds a predefined threshold value.

12. The radio base station according to claim 11, wherein said allocating means is configured to down-prioritize the allocation of the resource for the channel feedback information by distributing said resource such that collision between the resource for the scheduling request and the resource for the channel feedback information is minimized.

13. The radio base station according to claim 11, wherein said allocating means is configured to request the channel feedback information and said buffer status report when the allocating means determines that an estimated block error probability of a channel feedback information transmission including a data grant for a buffer status report is less than a predefined threshold value.

14. The radio base station according to claim 11, wherein said allocating means is configured to allocate a data grant in said message to the UE so the UE can indicate said buffer status report when the buffer status report is triggered in the UE.

15. The radio base station according to claim 14, wherein the data grant comprises a number of bits required for the buffer status report.

16. The radio base station according to claim 13, wherein said allocating means is further configured to disable the resource for the scheduling request.

17. The radio base station according to claim 11, wherein the channel feedback information corresponds to a channel quality indicator (CQI) or a channel state information (CSI), and wherein the allocating means is configured to allocate said resources periodically on a physical uplink control channel (PUCCH) or a-periodically on a physical uplink shared channel (PUSCH).

* * * * *